March 20, 1956　　　R. R. POYNOR　　　2,738,904
HOPPER EXTENSION
Filed Dec. 5, 1952
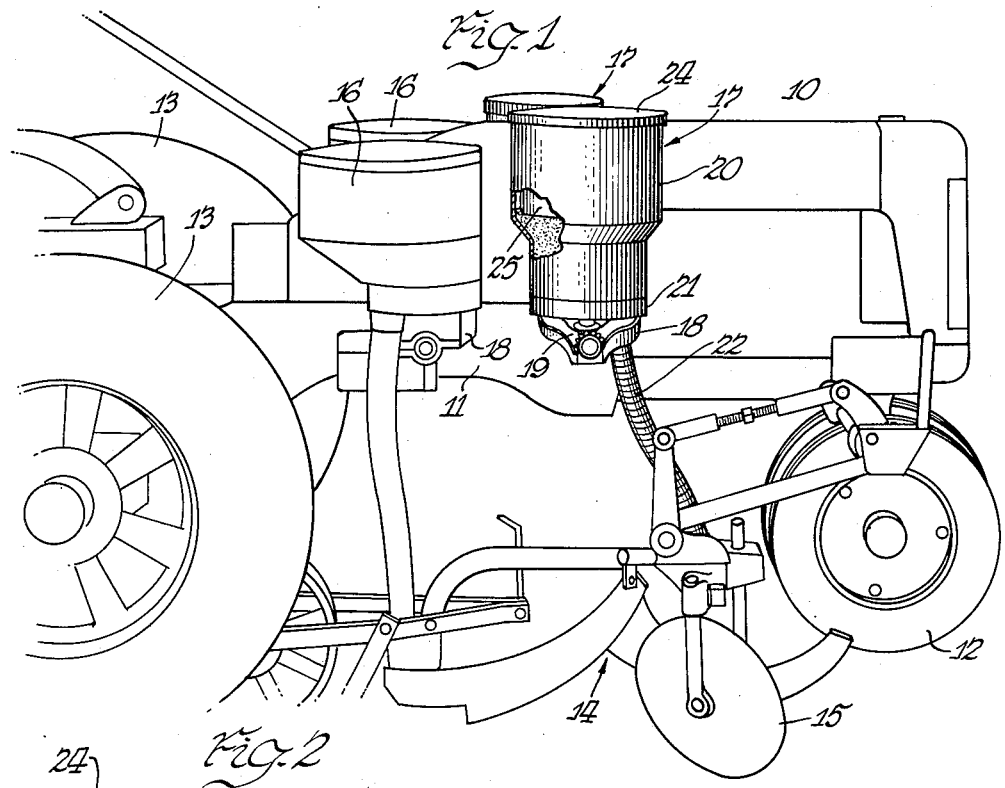
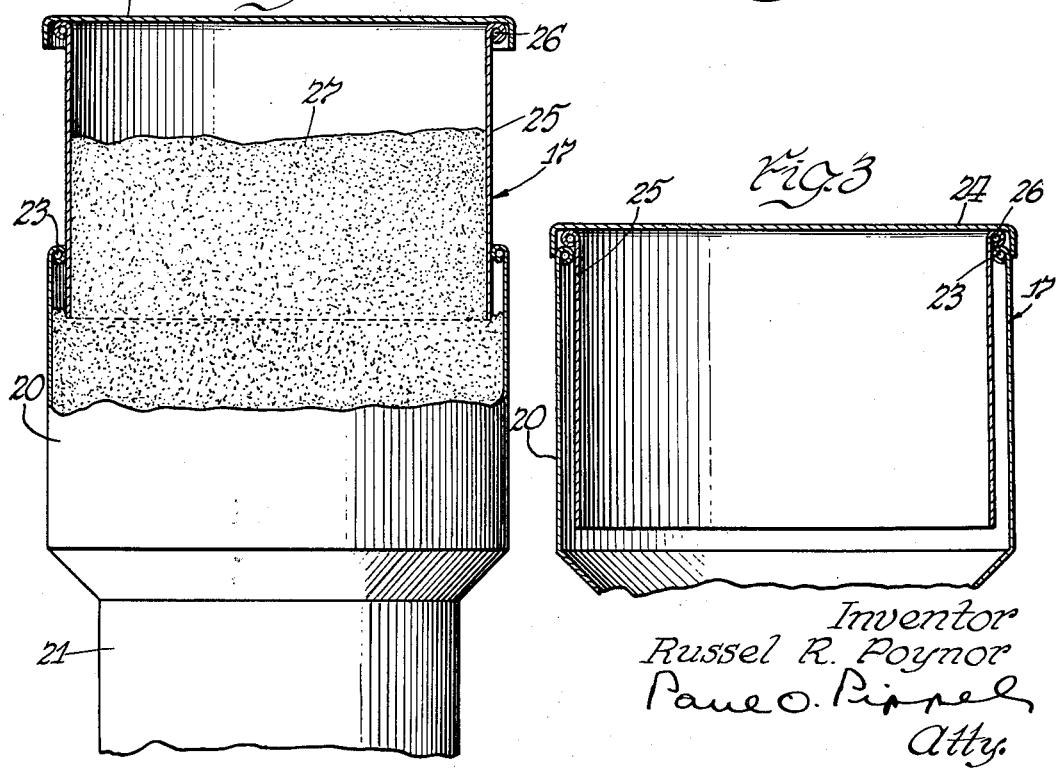
Inventor
Russel R. Poynor
Paul O. Pippel
Atty.

United States Patent Office 2,738,904
Patented Mar. 20, 1956

2,738,904

HOPPER EXTENSION

Russell R. Poynor, Elmhurst, Ill., assignor to International Harvester Company, a corporation of New Jersey Application December 5, 1952, Serial No. 324,323

3 Claims. (Cl. 222—386)

This invention relates to a hopper for dispensing bulk material and more particularly to a fertilizer hopper used for agricultural purposes.

The hopper of this invention will be described in its application to a traveling vehicle upon which it is mounted for the application of fertilizer to the soil. The fertilizer hopper of this invention is mounted upon a tractor at the side thereof, and is used in conjunction with a seed dispenser and earth working tools which prepare the soil for the reception of the seed and fertilizer. In such an implement the saving of tractor space and the visibility of the working area are important considerations and it is desirable that the size of the dispensing hopper be kept at a minimum.

In filling a fertilizer hopper mounted upon a vehicle the cover is removed and the fertilizer which is contained in a rather large bag is lifted by the operator and the fertilizer poured into the opening at the top of the hopper. The higher the opening in the hopper the higher the operator must lift the heavy bag of fertilizer or other material which is to be placed in the hopper. The present invention contemplates as its principal object the provision of an improved hopper construction increasing the capacity of a hopper of normal height and dimensions and facilitating the filling thereof by an operator.

Another object of the invention is the provision of a hopper extension for increasing the capacity thereof when desired.

Another object of the invention is the provision of a removable sleeve for a fertilizer hopper or the like by which the capacity of the hopper may be increased without increasing the labor and time required in filling.

Other objects and advantages of the invention will become clear from the following detailed description when read in conjunction with the accompanying drawings, wherein:

Fig. 1 is a perspective view in side elevation, partly in section, and with parts removed for clarity, of a tractor having mounted thereupon an agricultural implement having the improved hopper of the present invention incorporated therein.

Fig. 2 is an enlarged elevation, partly in section, showing the fertilizer hopper with the extendable sleeve therein and illustrating the manner in which the capacity of the main hopper is increased, and Fig. 3 is a cross-section of the upper portion of the hopper shown in Fig. 2 with the hopper empty and the sleeve fully received therein.

Referring to the drawings, the numeral 10 designates the longitudinally extending body of a tractor having a power plant 11, front wheels 12 and rear drive wheels 13.

The implement incorporating the fertilizer hopper of this invention is a planter designated by the numeral 14 and is illustrated diagrammatically as mounted upon the side of the tractor body. The earth working elements 15 which prepare the seed bed for the reception of seed and/or fertilizer forms no part of this invention. However, the implement includes seed dispensers 16, each of which is secured to a bracket 17 mounted on opposite sides of the tractor body, and fertilizer hoppers 17, each of which is secured to a bracket 18 and mounted on opposite sides of the tractor body.

Driving mechanism indicated at 19 for the fertilizer hopper 17 for discharging fertilizer therefrom is operated in any conventional manner by mechanism (not shown), deriving power from the tractor power plant. The fertilizer hopper 17 comprises an upper cylindrical main body portion 20 and a reduced base portion 21 from which fertilizer passes through a flexible tube 22 to the ground. The upper rim of the main body portion 20 is provided with an inwardly turned bead 23, and a cover 24 is provided therefor.

The height of the main body of the hopper 17 is such that an operator can lift a heavy bag of fertilizer and empty it into the hopper without too great an expenditure of energy. However, if the height of the hopper were increased in order to increase the capacity thereof, a great deal more strength would be required to raise a full bag of fertilizer to the top of the hopper. In order to overcome this obstacle and provide increased capacity for the fertilizer hopper, when needed, applicant provides an extendable sleeve member 25 of such dimensions as to fit the internal diameter of the main hopper body as determined by the bead 23, and telescopically slidable relative to the main hopper body. The upper end of the sleeve 25 is provided with an outwardly turned bead 26 which, when the sleeve is fully received in the main body 20, rests upon the internal bead 23 of the main hopper body as shown in Figure 3.

In operating the expandable hopper of this invention, the operator lifts the full bag of fertilizer to the top of the hopper in its collapsed position as shown in Figures 3, and empties fertilizer therein. At this point the bag of fertilizer is considerably lighter and easy to handle and the operator simply grasps the sleeve insert 25 at the bead 26 and lifts it to a position such as indicated in Figure 2. The fertilizer 27 fills in the space adjacent the walls of the main body 20 and the lower edge of the sleeve 25 rests thereupon. The bag of fertilizer is then lifted to the top of the sleeve 25 and the balance of the fertilizer poured therein. Of course, the sleeve is lowered into the main hopper body as the fertilizer is gradually emptied therefrom.

The operation of the fertilizer hopper extension of this invention should be clearly understood from the foregoing description. It should also be understood that the invention has been described in its preferred embodiment and that modifications may be made therein without departing from the spirit of the invention or the scope of the appended claims.

What is claimed is:

1. A hopper for dispensing agricultural fertilizer and the like comprising a tubular main body open at the top and having vertical walls and a discharge outlet at the bottom, and a separable tubular sleeve insertable in the top opening and substantially coextensive with the interior of the vertical walls of said main body, said sleeve being slidable vertically upwardly from the top of the main body to form a hopper extension and increase the capacity of the hopper, and said sleeve being supported by the material in the hopper and collapsible within the main body as the material is discharged and said sleeve being removable from the top of the hopper without impairing the operation thereof.

2. The invention set forth in claim 1, wherein the upper edge of the sleeve extension has an outwardly projecting bead and the upper edge of the main hopper body has an inwardly projecting bead engageable with the bead on the sleeve to support the latter.

3. A hopper for dispensing agricultural fertilizer and the like comprising a tubular main body open at the top and having vertical walls and a discharge outlet at the bottom, a cover for the hopper, and a tubular insert open at the bottom and top and telescopically slidable in the main body of the hopper to form an extension thereof, said insert having an annular projection extending outwardly from its upper edge and engageable with the upper edge of the main body when the insert is fully received therein, and said main body having an inwardly projecting bead engageable with the wall of the insert to provide a space therebetween and the wall of the main body; the external diameter of said projection being substantially equal to the external diameter of the main body to fit said cover when the insert is extended.

References Cited in the file of this patent

UNITED STATES PATENTS

| | | |
|---|---|---|
| 375,498 | McGuire | Dec. 27, 1887 |
| 548,457 | Pratt | Oct. 22, 1895 |
| 752,159 | Hamilton | Feb. 16, 1904 |
| 888,554 | Tuttle | May 26, 1908 |
| 1,039,980 | Lowe | Oct. 1, 1912 |
| 1,934,138 | Paul | Nov. 7, 1933 |
| 2,173,712 | Conner | Sept. 19, 1939 |
| 2,498,318 | Violette | Feb. 21, 1950 |

FOREIGN PATENTS

| | | |
|---|---|---|
| 667,426 | France | Oct. 6, 1929 |